(12) United States Patent
Miller et al.

(10) Patent No.: US 12,744,349 B2
(45) Date of Patent: Sep. 22, 2026

(54) COMMUNICATION SYSTEM HAVING CONNECTOR ASSEMBLY

(71) Applicant: TE Connectivity Solutions GmbH, Schaffhausen (CH)

(72) Inventors: Keith Edwin Miller, Manheim, PA (US); Shane W. Seace, Lititz, PA (US); Francis John Blasick, Halifax, PA (US)

(73) Assignee: TE Connectivity Solutions GmbH (CH)

( * ) Notice: Subject to any disclaimer, the term of this patent is extended or adjusted under 35 U.S.C. 154(b) by 364 days.

(21) Appl. No.: 18/603,383

(22) Filed: Mar. 13, 2024

(65) Prior Publication Data

US 2025/0293461 A1 Sep. 18, 2025

(51) Int. Cl.

| | |
|---|---|
| ***H01R 13/629*** | (2006.01) |
| ***H01R 12/91*** | (2011.01) |
| ***H01R 13/518*** | (2006.01) |
| ***H01R 13/631*** | (2006.01) |
| ***H01R 24/50*** | (2011.01) |
| *G02B 6/42* | (2006.01) |

(52) U.S. Cl.

CPC ........... *H01R 13/629* (2013.01); *H01R 12/91* (2013.01); *H01R 13/518* (2013.01); *H01R 13/6315* (2013.01); *H01R 24/50* (2013.01); *G02B 6/4293* (2013.01)

(58) Field of Classification Search

CPC .... H01R 13/629; H01R 12/91; H01R 13/518; H01R 13/6315; H01R 24/50; H01R 12/7011; H01R 12/7047; G02B 6/4293; G02B 6/3897; G02B 6/3817

See application file for complete search history.

(56) References Cited

U.S. PATENT DOCUMENTS

| | | | | |
|---|---|---|---|---|
| 5,138,679 | A * | 8/1992 | Edwards | G02B 6/4246 385/52 |
| 10,505,322 | B2 | 12/2019 | Miller | |
| 10,505,323 | B2 | 12/2019 | Miller et al. | |
| 10,558,000 | B2 | 2/2020 | Miller et al. | |
| 11,025,006 | B2 | 6/2021 | Miller et al. | |
| 12,531,359 | B1 * | 1/2026 | Orlock | H01R 12/91 |
| 2017/0146750 | A1 * | 5/2017 | Fortusini | G02B 6/403 |
| 2021/0376527 | A1 * | 12/2021 | Cheng | H01R 13/6315 |
| 2021/0376528 | A1 * | 12/2021 | Pao | H01R 13/6315 |
| 2023/0396007 | A1 * | 12/2023 | Cantle | H01R 12/722 |

* cited by examiner

*Primary Examiner* — Travis S Chambers

(57) ABSTRACT

A connector assembly includes a connector module having a connector body received in a passage through a substrate. The connector body includes a floating element that extends from the connector body. The connector body holds RF contacts and coaxial cables coupled to the RF contacts. The connector assembly includes a mounting frame coupled to the substrate having a locating element extending from the mounting frame. The locating element is spaced apart from the substrate to form a float pocket between the locating element and the substrate. The float pocket receives the floating element of the connector body and is oversized relative to the floating element to define a confined space to allow a limited amount of floating movement of the connector module relative to the substrate in a lateral direction that is perpendicular to the mating direction.

20 Claims, 13 Drawing Sheets

COMMUNICATION SYSTEM HAVING CONNECTOR ASSEMBLY

BACKGROUND

The subject matter described and/or illustrated herein relates generally to communication systems having connector assemblies.

Connectors are known for interconnecting various components, such as cables, circuit boards, and/or the like. Some known connectors are coaxial connectors including one or more coaxial contacts including a signal element and a ground element that is arranged coaxially with the signal element. Each coaxial contact may have a cable terminated thereto. The coaxial connectors may be used for a wide variety of applications, such as, but not limited to, radio frequency (RF) interconnections. As one example, a backplane communication system may include a large backplane circuit board that includes one or more windows. Each window is configured to receive a coaxial connector that is also mounted to the backplane circuit board using, for example, hardware. As such, the coaxial connectors are presented along one side of the circuit board for mating with corresponding coaxial connectors of a daughter card assembly or assemblies. Other known connectors, such as pin and socket connectors, have signal contacts and ground contacts arranged in a contact array. Such connectors may be terminated to a substrate, such as a circuit board, for mating with a mating connector. Other known connectors, such as fiber optic connectors, include fiber optic contacts. Such fiber optic connectors may be mounted to a substrate, such as a circuit board.

Known connectors are not without disadvantages. For example, it may be desirable to have connectors that have a greater density of contacts. Even with greater densities, however, it may be difficult to mate the opposing connectors. For example, the contacts of the connectors may be exposed and at risk of being damaged if the connectors are not sufficiently aligned during the mating operation.

Accordingly, there is a need for a connector having a greater density of contacts that also enables alignment of the contacts during the mating operation.

BRIEF DESCRIPTION

In one embodiment, a connector assembly is provided and includes a connector module that has a connector body received in a passage through a substrate. The connector body extends between a front side forward of the substrate and a rear side rearward of the substrate. The connector body includes a floating element that extends from the connector body. The connector body has contact channels therethrough between the front side and the rear side. The contact channels hold RF contacts in corresponding contact channels. The RF contacts are presented along the front side for engaging corresponding mating contacts of a mating connector in a mating direction along a mating axis. The connector module includes coaxial cables coupled to the RF contacts. The connector assembly includes a mounting frame coupled to the substrate. The mounting frame has a locating element extending from the mounting frame. The locating element is spaced apart from the substrate to form a float pocket between the locating element and the substrate. The float pocket receives the floating element of the connector body. The float pocket is oversized relative to the floating element and defines a confined space to allow floating movement of the floating element in the float pocket relative to the mounting frame and the substrate to allow a limited amount of floating movement of the connector module relative to the substrate in a lateral direction that is perpendicular to the mating direction.

In another embodiment, a connector assembly is provided and includes a connector module that has a connector body received in a passage through a substrate. The connector body extends between a front side forward of the substrate and a rear side rearward of the substrate. The connector body includes a floating element extending from the connector body. The connector body has contact channels therethrough between the front side and the rear side. The contact channels hold RF contacts in corresponding contact channels. The RF contacts are presented along the front side for engaging corresponding mating contacts of a mating connector in a mating direction along a mating axis. The connector module includes coaxial cables coupled to the RF contacts. The connector assembly includes a mounting frame coupled to the substrate. The mounting frame includes a front plate forward of the substrate and a rear plate rearward of the substrate. The rear plate is secured to a rear surface of the substrate. The front plate is secured to a front surface of the substrate. The front plate has a locating element extending from the front plate. The locating element is spaced apart from the front surface of the substrate to form a float pocket forward of the front surface of the substrate between the locating element and the substrate. The float pocket receives the floating element of the connector body. The float pocket is oversized relative to the floating element and defines a confined space to allow floating movement of the floating element in the float pocket relative to the mounting frame and the substrate to allow a limited amount of floating movement of the connector module relative to the substrate in a lateral direction that is perpendicular to the mating direction.

In a further embodiment, a connector assembly is provided and includes a connector module that has a connector body received in a passage through a substrate. The connector body extends between a front side forward of the substrate and a rear side rearward of the substrate. The connector body includes a floating element extending from the connector body. The connector body has a first contact channel therethrough between the front side and the rear side and a second contact channel therethrough between the front side and the rear side. The first contact channels hold an RF contact. The RF contact is presented along the front side for engaging a corresponding mating contact of a mating connector in a mating direction along a mating axis. The second contact channel holds a fiber optic connector. The fiber optic connector is presented along the front side for mating with a mating fiber optic connector in the mating direction. The connector module includes a fiber optic cable coupled to the fiber optic connector. The connector module includes a coaxial cable coupled to the RF contact. The connector assembly includes a mounting frame coupled to the substrate. The mounting frame has a locating element extending from the mounting frame. The locating element is spaced apart from the substrate to form a float pocket between the locating element and the substrate. The float pocket receives the floating element of the connector body. The float pocket is oversized relative to the floating element and defines a confined space to allow floating movement of the floating element in the float pocket relative to the mounting frame and the substrate to allow a limited amount of floating movement of the connector module relative to the substrate in a lateral direction that is perpendicular to the mating direction.

DETAILED DESCRIPTION

Embodiments set forth herein include connector assemblies and communication systems that include such connector assemblies. The communication system may include, for example, a circuit board that is secured to the connector assembly. In some embodiments, the communication system is a backplane (or midplane) communication system. As used herein, the terms backplane and midplane are used interchangeably and represent a system interface for multiple daughter card assemblies (e.g., line cards or switch cards). In other embodiments, the communication system is a circuit board assembly (e.g., daughter card assembly). In other embodiments, the communication system is a fiber optic communication system. One or more embodiments permit a connector module of the connector assembly to float during a mating operation. One or more embodiments enable using a denser grouping of contacts.

As used herein, phrases such as "a plurality of [elements]," "a set of [elements]," "an array of [elements]," and the like, when used in the detailed description and claims, do not necessarily include each and every element that a component may have. For instance, the phrase "the connector module having a plurality of contacts that include [a recited feature]" does not necessarily mean that each and every contact of the connector module has the recited feature. Instead, only some of the contacts may have the recited feature and other contacts of the connector module may not include the recited feature. As another example, the detailed description or the claims may recite that a connector assembly includes "cable assemblies, each of which including a [recited feature]." This phrase does not exclude the possibility that other cable assemblies of the connector assembly may not have the recited feature. Accordingly, unless explicitly stated otherwise (e.g., "each and every cable assembly of the connector module"), embodiments may include similar elements that do not have the same features.

Figure 1:
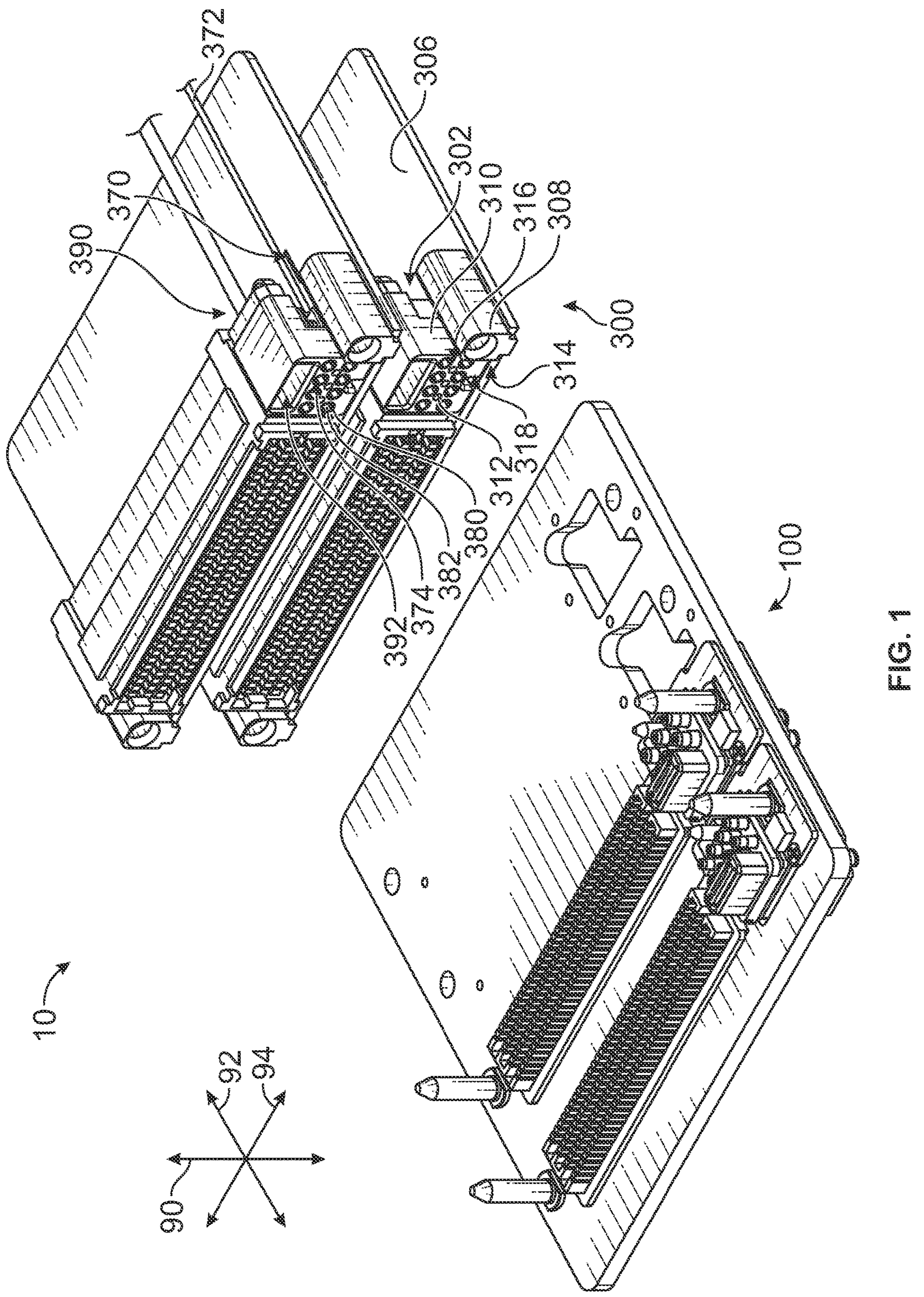
FIG. 1 is a perspective view of a communication system formed in accordance with an exemplary embodiment, showing a connector assembly and a mating connector assembly in an unmated state.

FIG. 1 is a perspective view of a communication system 10 formed in accordance with an exemplary embodiment, showing a connector assembly 100 and a mating connector assembly 300 in an unmated state. In an exemplary embodiment, the connector assemblies 100, 300 include coaxial connector assemblies. The connector assemblies 100, 300 may additionally or alternatively include fiber optic connector assemblies. The communication system 10 may be provided with other types of connector assemblies, such as pin and socket connector assemblies. The connector assemblies 100, 300 are configured to be mated along a mating axis.

In some applications, the connector assemblies 100, 300 may be referred to more generally as a circuit board assemblies. The communication system 10 may be configured for radiofrequency (RF) applications. In particular embodiments, the communication system 10 and/or its components, such as the connector assembly 100 and/or 300, are configured to satisfy military and aerospace applications. For example, the components of the communication system 10 may be configured to satisfy one or more industry or government standards. To illustrate one example of the communication system 10, the connector assemblies 100, 300 may form an interconnect between analog and digital sections of a radio. The connector assembly 300 may perform analog functions. The connector assembly 300 may be replaced with other connector assemblies that are configured to perform the same or different operations. The digital functions, including digital signal processing, may be performed by a communication component (not shown) that is coupled to the connector assembly 100. The other communication component may be another daughter card assembly (not shown).

The communication system 10 and/or its components (e.g., the connector assembly 100 and/or 300) may be configured to satisfy one or more industry or government standards. By way of example only, embodiments may be configured to satisfy the VME International Trade Association (VITA) standards (e.g., VITA 90, et al.). The communication system 10 and/or its components may have an operating speed that achieves 50 GHz or greater. In particular embodiments, the communication system 10 and/or its components may achieve an operating speed of 60 GHz or greater. It should be understood, however, that other embodiments may be configured for different standards and may be configured to operate at different speeds. In some configurations, embodiments may be configured to operate within the range of DC to 60.0 GHz.

In an exemplary embodiment, the connector assembly 300 is a daughter card assembly having a connector module 302 and a substrate 306. The connector module 302 is mounted to the substrate 306. The substrate 306 may be a circuit card, such as a daughter card. The connector assembly 300 includes a guide module 308 mounted to the substrate 306 proximate to the connector module 302. The guide module 308 is used to guide mating with the connector assembly 100. In the illustrated embodiment, the guide module 308 includes an opening configured to receive an alignment pin. The opening may be chamfered or have a lead-in. Other types of guide features may be used in alternative embodiments, such as a guide post. In the illustrated embodiment, the connector module 302 is a right-angle connector module having the substrate 306 oriented perpendicular to the mating face of the connector module 302. The substrate 306 is oriented perpendicular to the substrate of the connector assembly 100. However, other orientations are possible in alternative embodiments. For example, the connector module 302 may be a mezzanine connector having the substrate 306 oriented parallel to the mating face and parallel to the substrate of the connector assembly 100. Additional electrical connectors may be mounted to and/or electrically connected to the substrate 306 and are configured to be mated simultaneously with the connector module 302 along the mating axis.

The connector module 302 includes a connector body 310 holding cable assemblies 370. The connector body 310 extends between a mating end 312 and a mounting end 314. Optionally, the mounting end 314 may be oriented perpendicular to the mating end 312. The mounting end 314 is mounted to the substrate 306. In the illustrated embodiment, the mating end 312 is oriented perpendicular to the substrate 306. The connector body 310 includes a plurality of contact channels 316 receiving corresponding cable assemblies 370. The connector body 310 includes alignment features 318 for aligning the connector module 302 with the connector assembly 100 during mating. In the illustrated embodiment, the alignment features 318 are openings and may be referred to hereinafter as openings 318. Other types of alignment features may be provided in alternative embodiments. The openings 318 may be arranged to provide keyed mating with the connector assembly 100.

Each cable assembly 370 includes a cable 372 and a contact 374 terminated to the end of the cable 372. The contact 374 has a mating end 376 for mating with the coaxial connector assembly 100. In various embodiments, the contact 374 is a coaxial contact; however, other types of contacts may be provided in alternative embodiments, such as pin contacts, socket contacts, fiber optic contacts (for example, fiber optic ferrules), and the like. In an exemplary embodiment, the coaxial contact 374 is an RF contact. The coaxial contact 374 includes an inner conductor 380 and an outer conductor 382 surrounding the inner conductor 380. The inner conductor 380 is configured to be terminated to a conductor of the cable 372. The outer conductor 382 is configured to be terminated to a shield, such as a cable braid, of the cable 372. Other arrangements are possible in alternative embodiments. In alternative embodiments, the connector assembly 300 does not include the cables 372 that directly couple to the contacts 374. For example, the contacts 374 may directly terminate to the substrate 306 (for example, the daughtercard) and/or may be communicatively coupled to cables through traces and vias (not shown) of the substrate 306.

In an exemplary embodiment, the connector module 302 includes a fiber optic connector 390. The fiber optic connector 390 includes fiber optic contacts, such as fiber optic ferrules. The fiber optic connector 390 is held by the connector body 310. For example, the fiber optic connector 390 is held in a channel 392. In alternative embodiments, the connector module 302 is provided without the fiber optic connector 390, rather including only RF/coaxial contacts.

For reference, the connector assembly 100 is oriented with respect to mutually perpendicular axes 90-94, which includes a mating axis 90, a first lateral axis 92, and a second lateral axis 94 (the connector assembly 300 is illustrated in FIG. 1 rotated 90° relative to the mating direction along the mating axis 90). The first and second lateral axes 92, 94 may define a lateral plane. As used herein, if an element moves "laterally" or in a "lateral direction," the movement may be in any direction along the lateral plane. For example, the movement may be parallel to the first lateral axis 92, parallel to the second lateral axis 94, or in a direction with a component along the first lateral axis 92 and a component along the second lateral axis 94. The connector assembly 100 may have any orientation with respect to gravity.

Figure 2:
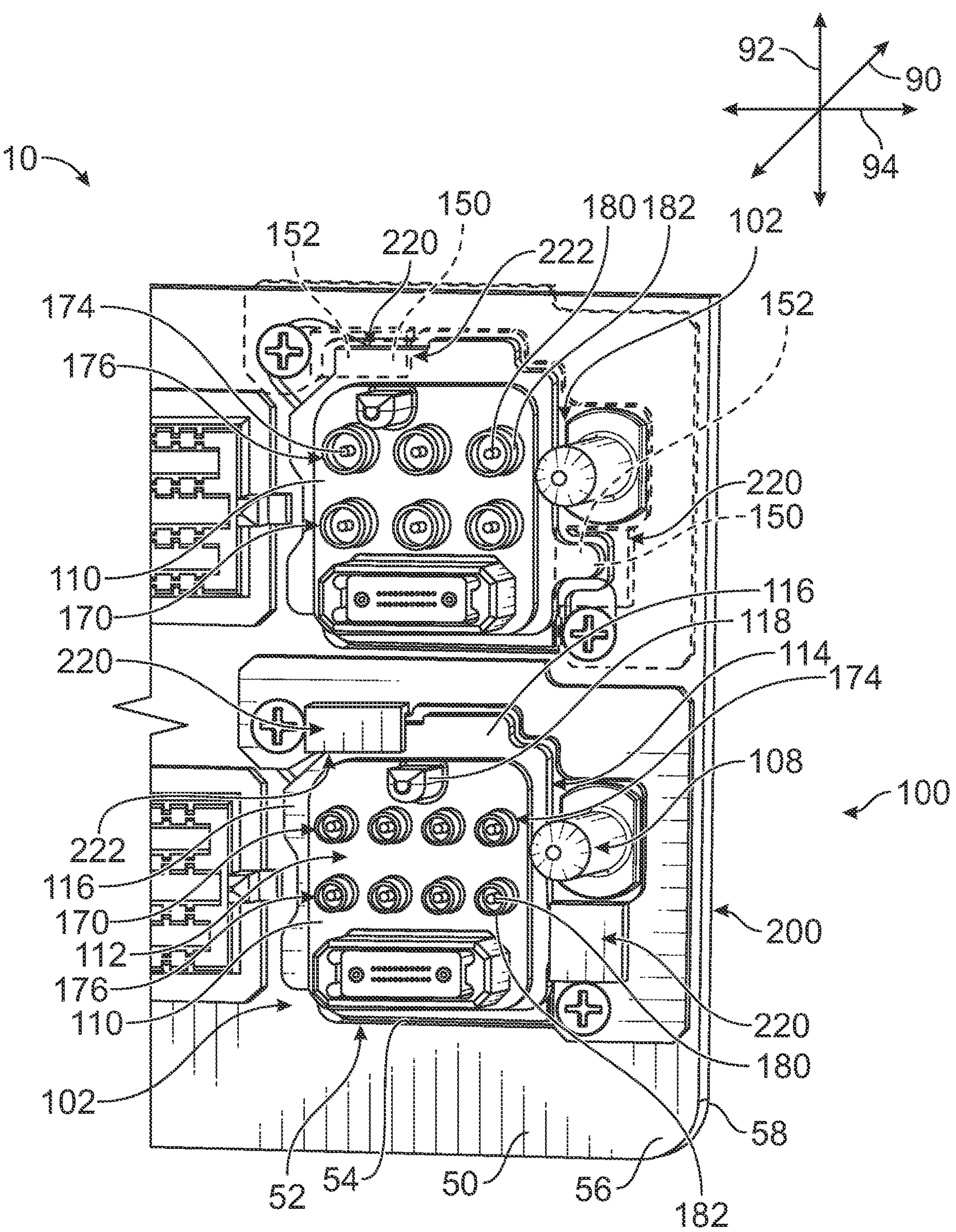
FIG. 2 is a front perspective view of a portion of the communication system showing the connector assembly in accordance with an exemplary embodiment.

FIG. 2 is a front perspective view of a portion of the communication system 10 showing the connector assembly 100 in accordance with an exemplary embodiment. The connector assembly 100 includes a connector module 102 and a mounting frame 200 that are operably coupled to each other. The connector module 102 is mounted to a substrate 50. The mounting frame 200 is mounted to the substrate 50. The mounting frame 200 couples the connector module 102 to the substrate 50. In an exemplary embodiment, the mounting frame 200 loosely couples the connector module 102 to the substrate 50 allowing a limited amount of floating movement of the connector module 102 relative to the substrate 50 to allow for alignment of the connector module 102 with the mating connector module 302 (FIG. 1).

The substrate 50 may be, for example, a circuit board (for example, a backplane circuit board), a panel, or another type of wall. The mounting frame 200 is used to support the connector module 102 relative to the substrate 50. In an exemplary embodiment, the substrate 50 includes a passage 52 therethrough that receives the connector module 102. The passage 52 is defined by substrate edges 54. In an exemplary embodiment, the passage 52 is an interior passage that is completely surrounded on all sides by the substrate 50. The connector module 102 is configured to be loaded into the passage 52 from the front or the rear of the substrate 50. Alternatively, the passage 52 may have an open side, such as being located at an exterior side of the substrate 50 such that the connector module 102 can be side loaded into the passage 52. In an exemplary embodiment, the passage 52 extends entirely through the substrate 50 between a front surface 56 and a rear surface 58 or rear of the substrate 50. In various embodiments, the substrate 50 may include multiple passages 52 receiving corresponding connector modules 102.

The connector module 102 includes a connector body 110 having a mating end 112 and a mounting end 114. The mounting end 114 is configured to be mounted to the substrate 50. For example, the mounting end 114 faces the front surface 56 of the substrate 50. The mating end 112 is configured to be mated with the mating connector module 302. The connector body 110 includes alignment features 118 for aligning the connector module 102 with the mating connector assembly 300 during mating. In the illustrated embodiment, the alignment feature 118 is an alignment post or an alignment pin. Other types of alignment features may be provided in alternative embodiments. The alignment feature 118 may be arranged to provide keyed mating with the mating connector assembly 300. The connector assembly 100 includes a guide module 108 mounted to the substrate 50 proximate to the connector module 102. The guide module 108 is used to guide mating with the mating connector assembly 300. In the illustrated embodiment, the guide module 108 is a guide post or a guide pin. Other types of guide features may be used in alternative embodiments, such as a guide block having an opening configured to receive a guide post.

The connector module 102 includes a cable assembly 170 coupled to the connector body 110. The cable assembly 170 includes an array of cables 172 (FIG. 3) terminated to an array of contacts 174. The contacts 174 are held by the connector body 110. Each contact 174 has a mating end 176 configured to be mated with the corresponding contact 374 (FIG. 1) of the mating connector module 302. In various embodiments, the contacts 174 are coaxial contacts; however, the contacts 174 may be other types of contacts, such as pin contacts, socket contacts, fiber optic contacts, and the like. In an exemplary embodiment, the coaxial contact 174 is an RF contact. The coaxial contact 174 includes an inner conductor—180 and an outer conductor 182 surrounding the inner conductor 180. The inner conductor 180 is configured to be terminated to a conductor of the cable 172. The outer conductor 182 is configured to be terminated to a shield, such as a cable braid, of the cable 172. In alternative embodiments, the connector assembly 100 does not include the cables 172 that directly couple to the contacts 174. For example, the contacts 174 may directly terminate to a circuit board, such as the substrate 50.

In an exemplary embodiment, the connector body 110 includes a mounting flange 116 at the mounting end 114. The mounting flange 116 is configured to be mounted to the substrate 50, such as to the front surface 56 of the substrate 50. The connector body 110 is loaded into the passage 52 until the mounting flange 116 is seated on the substrate 50. The mounting flange 116 supports the connector body 110 relative to the substrate 50. In an exemplary embodiment, the connector body 110 includes one or more floating elements 150 extending from the connector body 110. The floating element(s) 150 may be located at the mounting end 114. For example, the floating elements 150 may form part of and/or extend from the mounting flange 116. The floating element 150 may be mounted to the substrate 50, such as to the front surface 56. The floating element 150 is configured to slide laterally (e.g., in a lateral direction) along the front surface 56 for mating with the mating connector module 302. The lateral direction may be parallel to the first lateral axis 92 and/or parallel to the second lateral axis 94. For example, the lateral movement may be parallel to the plane of the substrate 50.

In an exemplary embodiment, the mounting frame 200 includes a locating element 220 extending from the mounting frame 200. The locating element 220 interfaces with the floating element 150 to control floating movement of the connector body 110 relative to the mounting frame 200. In an exemplary embodiment, the locating element 220 is spaced apart from the substrate 50, such as from the front surface 56, to form a float pocket 222 between the locating element 220 and the substrate 50. The float pocket 222 is forward of the front surface 56. The locating element 220 is captured in the float pocket 222, such as being sandwiched between the locating element 220 and the front surface 56. The float pocket 222 receives the floating element 150 of the connector body 110. The float pocket 222 is oversized relative to the floating element 150 and defines a confined space to allow floating movement of the floating element 150 in the float pocket 222 relative to the mounting frame 200 and the substrate 50 to allow a limited amount of floating movement of the connector module 102 relative to the substrate 50 in a lateral direction that is perpendicular to the mating direction. In an exemplary embodiment, the mounting frame 200 is oversized relative to the connector module 102 such that the connector module 102 has a limited amount of floating movement relative to the mounting frame 200, such as for alignment with the connector assembly 300 during mating. During operation or usage of the connector assembly 100, a portion of the connector module 102 is floatably held in the mounting frame 200, to allow movement of the connector module 102 relative to the substrate 50. For example, the connector module 102 is permitted to move laterally (e.g., in a lateral direction) during a mating operation (for example, parallel to the plane of the substrate 50). The lateral direction may be parallel to the first lateral axis 92 and/or parallel to the second lateral axis 94. However, it should be understood, that the lateral direction may be any direction that is perpendicular to the mating axis 90 or parallel to a plane defined by the first and second lateral axes 92, 94.

Figure 3:
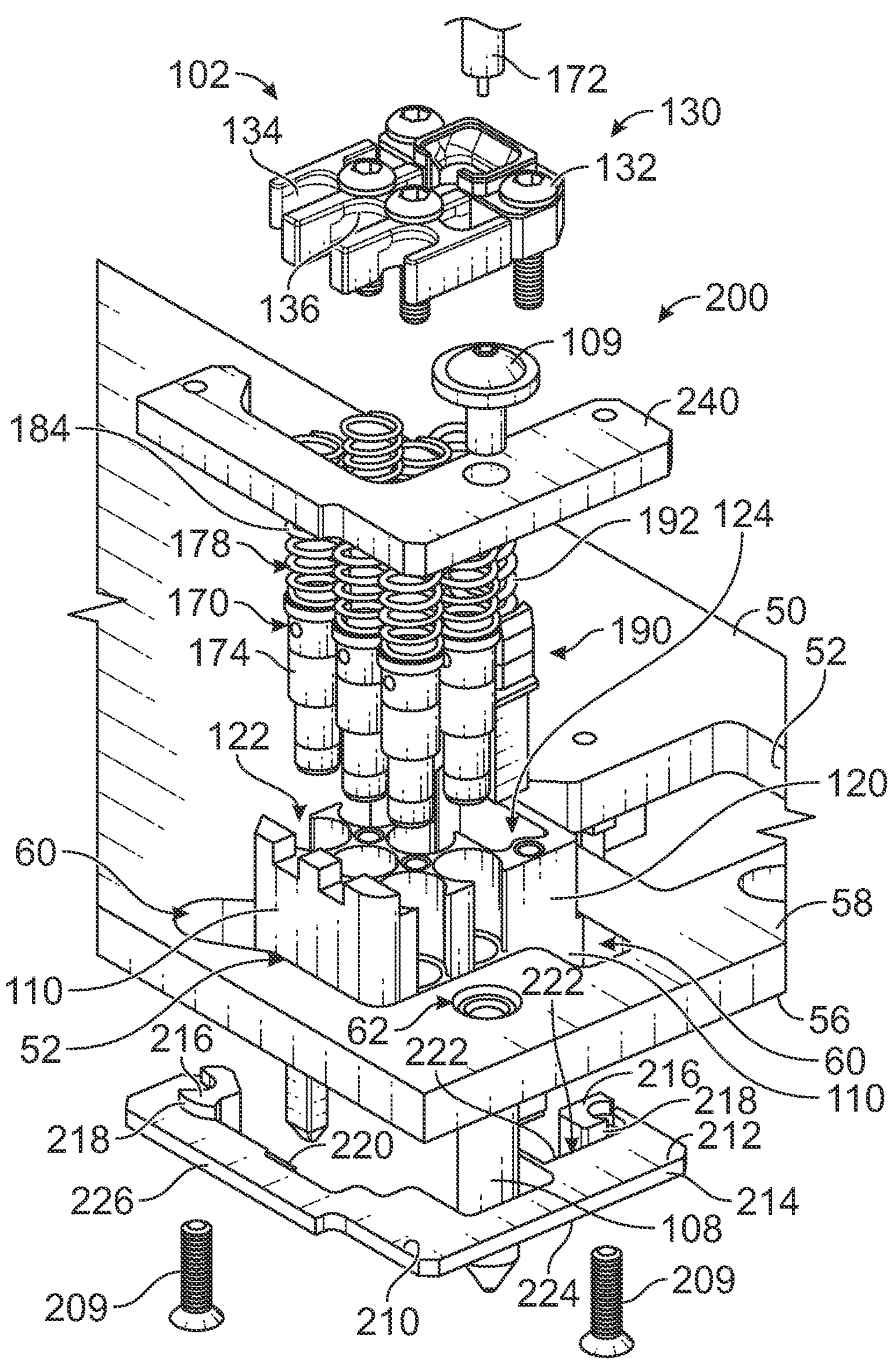
FIG. 3 is an exploded view of the connector assembly in accordance with an exemplary embodiment.

FIG. 3 is an exploded view of the connector assembly 100 in accordance with an exemplary embodiment. FIG. 3 shows the connector assembly 100 relative to the substrate 50. The connector assembly 100 is configured to be coupled to the substrate 50 at the passage 52. Portions of the connector assembly 100 pass through the passage 52 through substrate 50.

The passage 52 passes through the substrate 50 between the front surface 56 and the rear surface 58. In the illustrated embodiment, the passage 52 is generally rectangular, such as square. The passage 52 may have other shapes in alternative embodiments. In an exemplary embodiment, the passage 52 includes notches or cutouts 60 extending from the central portion of the passage 52. For example, the cutouts 60 may be located at or near the corners. The cutouts 60 may be used for orienting the connector assembly 100 relative to the substrate 50. For example, the cutouts 60 may be keying features to orient the connector assembly 100 relative to the substrate 50. In an exemplary embodiment, the passage 52 is oversized relative to the connector body 110 to allow the connector body 110 to move laterally within the passage 52. For example, the connector body 110 may be configured to move along the first lateral axis 92 and/or the 2nd lateral axis 94. The edge 54 may confine the lateral movement of the connector body 110 within the passage 52 by defining a float limit that restricts movement beyond a predetermined amount defined by the size of the gap between the connector body 110 and the edge 54.

In an exemplary embodiment, the substrate 50 includes one or more openings 62 (see FIG. 8) separate from the passage 52 and the cutouts 60. The openings 62 may receive portions of the connector assembly 100. In an exemplary embodiment, the opening 62 receives the guide module 108 and/or a fastener 109. For example, the guide module 108 may be coupled to the substrate 50 by a fastener 109 passing through the opening 62 to threadably couple to the guide module 108. Other types of securing means may be used in alternative embodiments. In an exemplary embodiment, the mounting frame 200 may be coupled to the substrate 50 by the fastener 109.

The connector module 102 includes the connector body 110 and the cable assembly 170. In an exemplary embodiment, the connector body 110 holds a plurality of the cable assemblies 170 in an array, such as in multiple rows and/or columns. Each cable assembly 170 includes the cable 172 and the corresponding contact 174. The contact 174 extends between the mating end 176 and a cable end 178. The cable 172 is terminated to the cable end 178. In an exemplary embodiment, each cable assembly 170 includes a biasing element 184 coupled to the contact 174, such as at the cable end 178. In various embodiments, the biasing element 184 is a spring element, such as a coil spring. Other types of biasing elements may be used in alternative embodiments. The cable 172 may pass through the biasing element 184.

In an exemplary embodiment, the connector body 110 includes a housing 120 configured to be plugged into the passage 52. The housing 120 of the connector body 110 includes a plurality of contact channels 122 that received the contacts 174 of the corresponding cable assemblies 170. In an exemplary embodiment, the housing 120 of the connector body 110 includes a fiber optic channel 124 that receives the fiber optic connector 190. In the illustrated embodiment, the housing 120 is generally box shaped having the opposite sides and opposite ends extending between the sides. The housing 120 may have other shapes and alternative embodiments. The housing 120 is configured to pass through the central portion of the passage 52. Optionally, the housing 120 may include orientation features extending outward from the housing 120 configured to be received in the cutouts 60 of the substrate 50 to orient the connector body 110 relative to the substrate 50.

In an exemplary embodiment, the connector body 110 includes one or more rear covers 130 configured to be coupled to a rear of the housing 120. The rear covers 130 may be secured to the housing 120 using fasteners 132. The rear covers 130 include cable channels 134 that received the corresponding cables 172. In an exemplary embodiment, the rear covers 130 include shoulders 136 in the cable channels 134 that support ends of the biasing elements 184. The biasing elements 184 may be contained between the shoulders 136 and the rear ends of the contacts 174. The biasing elements 184 may forward bias the contacts 174 in the contact channels 122 against the shoulders 136 of the rear covers 130, such as for mating with the mating contacts of the mating connector module 302. In an exemplary embodiment, the fiber optic connector 190 includes a biasing element 192 configured to engage the corresponding rear cover 130. The biasing element 192 forward biases the fiber optic connector 190 in the fiber optic channel 124, such as for mating with the mating fiber optic connector.

In an exemplary embodiment, the connector module 102 includes the mounting frame 200 used to mount the connector body 110 to the substrate 50. The mounting frame 200 is separate and discrete from the connector body 110. The mounting frame 200 is configured to be coupled to the substrate 50 separate from the connector body 110. When assembled, the mounting frame 200 holds the connector body 110 on the substrate 50. In an exemplary embodiment, the mounting frame 200 is a multipiece frame including multiple, discrete pieces, which may be separately assembled and coupled to the substrate 50. In the illustrated embodiment, the mounting frame 200 includes a front frame 210 and a rear frame 240. The front frame 210 is configured to be coupled to the front surface 56 of the substrate 50. The rear frame 240 is configured to be coupled to the rear surface 58 of the substrate 50. In the illustrated embodiment, the rear frame 240 is configured to be coupled to the guide module 108 using the fastener 109 to secure the rear frame 240 relative to the substrate 50 to mount the rear frame 240 independent of the substrate 50. However, the rear frame 240 may be directly coupled to the substrate 50 in alternative embodiments. In the illustrated embodiment, the front frame 210 is configured to be coupled to the rear frame 240 using fasteners 209 to mount the front frame 210 independent of the substrate 50. Such a mounting scheme allows mounting of the frame elements independent of the thickness of the substrate 50 and thus allows the mounting frame 200 to be mounted to different substrates of different thicknesses. However, the front frame 210 may be directly coupled to the substrate 50 in alternative embodiments.

The front frame 210 includes an inner surface 212 and an outer surface 214. The inner surface 212 is configured to face the front surface 56 of the substrate 50. For example, the inner surface 212 may be a rear surface of the front frame 210. The inner surface 212 may abut against and seat on the front surface 56 of the substrate 50. In an exemplary embodiment, the front frame 210 includes one or more positioning tabs 216 extending from the inner surface 212. The positioning tabs 216 are used to position the front frame 210 relative to the substrate 50. The positioning tabs 216 include positioning shoulders 218 configured to engage the substrate 50 to position the front frame 210 relative to the substrate 50. In an exemplary embodiment, the positioning tabs 216 are configured to be received in the cutouts 60. The positioning shoulders 218 are configured to engage the edge 54 around the cutouts 60 to locate the positioning tab 216 within the passage 52. In the illustrated embodiment, a pair of the positioning tabs 216 are provided. The front frame 210 may include greater or fewer positioning tabs 216 in alternative embodiments. In an exemplary embodiment, the front frame 210 includes openings configured to receive the fasteners 109, 209. The openings may be threaded.

In an exemplary embodiment, the front frame 210 includes the locating elements 220. The locating elements 220 may be located at the outer surface 214. The locating elements 220 are covers or hoods that form the float pockets 222. The float pockets 222 are open at the inner surface 212. In an exemplary embodiment, the front frame 210 includes multiple locating elements 220 and corresponding float pockets 222. For example, the front frame 210 includes a first locating element on a first beam 224 of the front frame 210 configured to extend along a first side of the passage 52 and a second locating element on a second beam 226 of the front frame 210 configured to extend along a different second side of the passage 52. The first beam 224 meets the second beam 226 at a corner of the front frame 210. The first and second beams 224, 226 may extend generally perpendicular to each other. For example, the front frame 210 may be generally L-shaped. The front frame 210 may include additional beams in alternative embodiments. For example, the front frame 210 may be U-shaped having a third beam extending from the first beam 224 or the second beam 226. In other various embodiments, the front frame 210 may be square shaped having four beams extending along four sides of the passage 52. The front frame 210 may have other shapes in alternative embodiments.

Figures 4, 5:
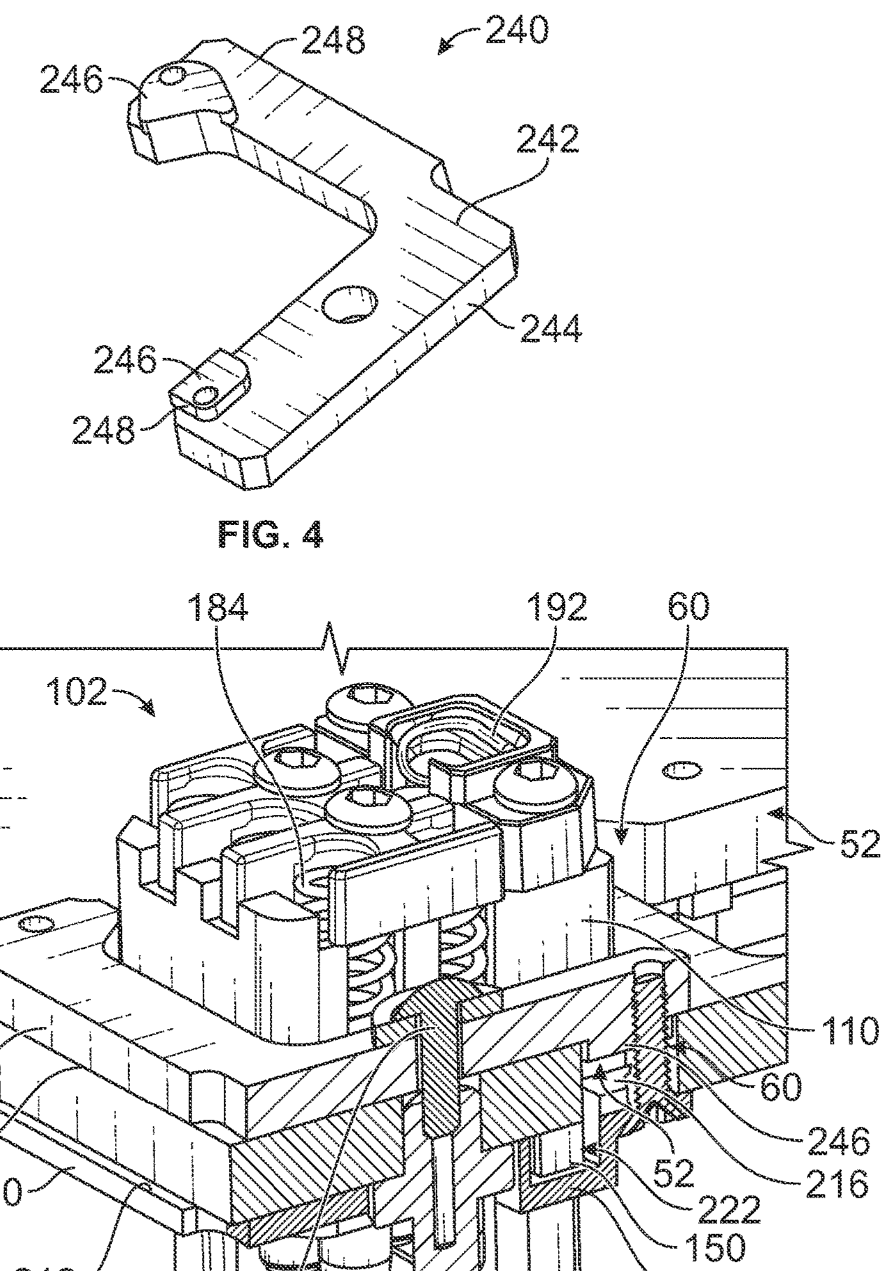
FIG. 4 is a front perspective view of the rear frame including an inner surface and an outer surface in accordance with an exemplary embodiment.
FIG. 5 is a sectional view of the connector module in accordance with an exemplary embodiment.

With additional reference to FIG. 4, which is a front perspective view of the rear frame 240 includes an inner surface 242 and an outer surface 244. The inner surface 242 is configured to face the rear surface 58 of the substrate 50. For example, the inner surface 242 may be a front surface of the rear frame 240. The inner surface 242 may abut against and seat on the rear surface 58 of the substrate 50. In an exemplary embodiment, the rear frame 240 includes one or more positioning tabs 246 extending from the inner surface 242. The positioning tabs 246 are used to position the rear frame 240 relative to the substrate 50. The positioning tabs

246 include positioning shoulders 248 configured to engage the substrate 50 to position the rear frame 240 relative to the substrate 50. In an exemplary embodiment, the positioning tabs 246 are configured to be received in the cutouts 60. The positioning shoulders 248 are configured to engage the edge 54 around the cutouts 60 to locate the positioning tab 246 within the passage 52. In the illustrated embodiment, a pair of the positioning tabs 246 are provided. The rear frame 240 may include greater or fewer positioning tabs 246 in alternative embodiments. In an exemplary embodiment, the rear frame 240 includes openings configured to receive the fasteners 109, 209. The openings may be threaded.

FIG. 5 is a sectional view of the connector module 102 in accordance with an exemplary embodiment. FIG. 5 shows the connector body 110 and the mounting frame 200 coupled to the substrate 50. The mounting frame 200 is used to secure the connector body 110 to the substrate 50.

During assembly, the cable assemblies 170 and the fiber optic connector 190 are received in the connector body 110. The rear covers 130 retain the cable assemblies 170 and the fiber optic connector 190 in the connector body 110. The biasing elements 184, 192 forward bias the cable assemblies 170 and the fiber optic connector 190, respectively in the connector body 110.

During assembly, the connector body 110 is front loaded into the passage 52. For example, the connector body 110 is loaded into the passage 52 through the front surface 56 until the mounting flange 116 is seated at the front surface 56. The mounting frame 200 may be coupled to the substrate 50 after the connector body 110 is coupled to the substrate 50.

During assembly, the rear frame 240 is coupled to the substrate 50. For example, the inner surface 242 is seated against the rear surface 58 of the substrate 50. The positioning tabs 246 are received in the cutouts 60 to locate the rear frame 240 relative to the substrate 50. The rear frame 240 is secured using the fastener 109. For example, the fastener 109 may be threadably coupled to the guide module 108 to secure the rear frame 240 to the substrate 50. Optionally, the rear frame 240 may be coupled to the substrate 50 prior to assembling the connector body 110 to the substrate 50. After the rear frame 240 and the connector body 110 are coupled to the substrate 50, the front frame 210 is configured to be coupled to the substrate 50 to cover the connector body 110 and secure the connector body 110 to the substrate 50. The inner surface 212 of the front frame 210 is seated against the front surface 56 of the substrate 50. The positioning tabs 216 are received in the cutouts 60 to locate the front frame 210 relative to the substrate 50. The fasteners 209 are used to secure the front frame 210. For example, the fasteners 209 may be coupled between the front frame 210 and the rear frame 240. In the illustrated embodiment, the fasteners 209 are front loaded through respective openings in the front frame 210 and the rear frame 240. The fasteners 209 may be threadably coupled to the rear frame 240. The fasteners 209 may pass through the cutouts 60 between the front frame 210 and the rear frame 240. In alternative embodiments, the fasteners 209 maybe assembled from the rear side through the rear frame 240 to threadably couple to the front frame 210. And other alternative embodiments, the fastener 109 and the guide module 108 may be used to secure the front frame 210 to the substrate 50. For example, the front frame 210 and the rear frame 240 may be sandwiched between the guide module 108 and the fastener 109. Other types of securing features may be used in alternative embodiments to secure the front frame 210 and or the rear frame 240 to the substrate 50, such as latches, clips, solder, welding, adhesive, and the like.

With additional reference back to FIG. 2, when assembled, the floating elements 150 are received in the float pockets 222 of the locating elements 220. The floating elements 150 include tabs 152 extending from the mounting flange 116. The floating elements 150 may be coplanar with the mounting flange 116. The locating elements 220 are oversized relative to the floating elements 150 to allow the floating elements 150 to move or float within the float pockets 222. The floating elements 150 are captured in the float pockets 222, such as being sandwiched between the locating element 220 and the front surface 56. The locating element 220 is located forward of the floating element 150 to prevent forward movement of the connector body 110 along the mating axis 90. The locating element 220 confines movement of the floating elements 150 in the lateral directions, such as along the first lateral axis 92 and/or the second lateral axis 94.

Figure 6:
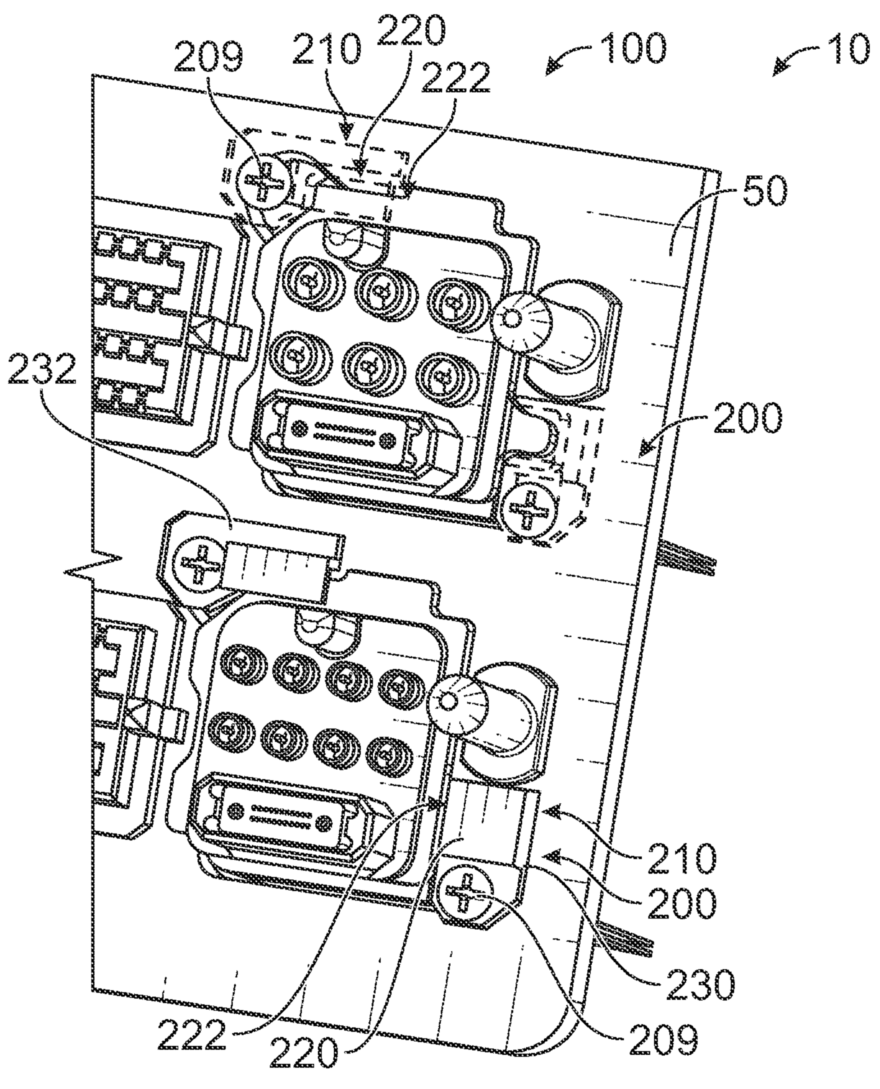
FIG. 6 is a front perspective view of a portion of the communication system showing the connector assembly in accordance with an exemplary embodiment.

FIG. 6 is a front perspective view of a portion of the communication system 10 showing the connector assembly 100 in accordance with an exemplary embodiment. FIG. 6 shows the front frame 210 of the mounting frame 200 having a different shape. For example, the front frame 210 includes multiple, discrete pieces, such as a first front frame element 230 and a second front frame element 232. The first front frame element 230 is used in place of the first beam 224 (FIG. 3). The second front frame element 232 is used in place of the second beam 226 (FIG. 3). The front frame elements 230, 232 include corresponding locating elements 220 and float pockets 222. The front frame elements 230, 232 are configured to be secured to the substrate 50 using the fasteners 209, which may be threadably coupled to the rear frame 240 (shown in FIG. 3).

Figure 7:
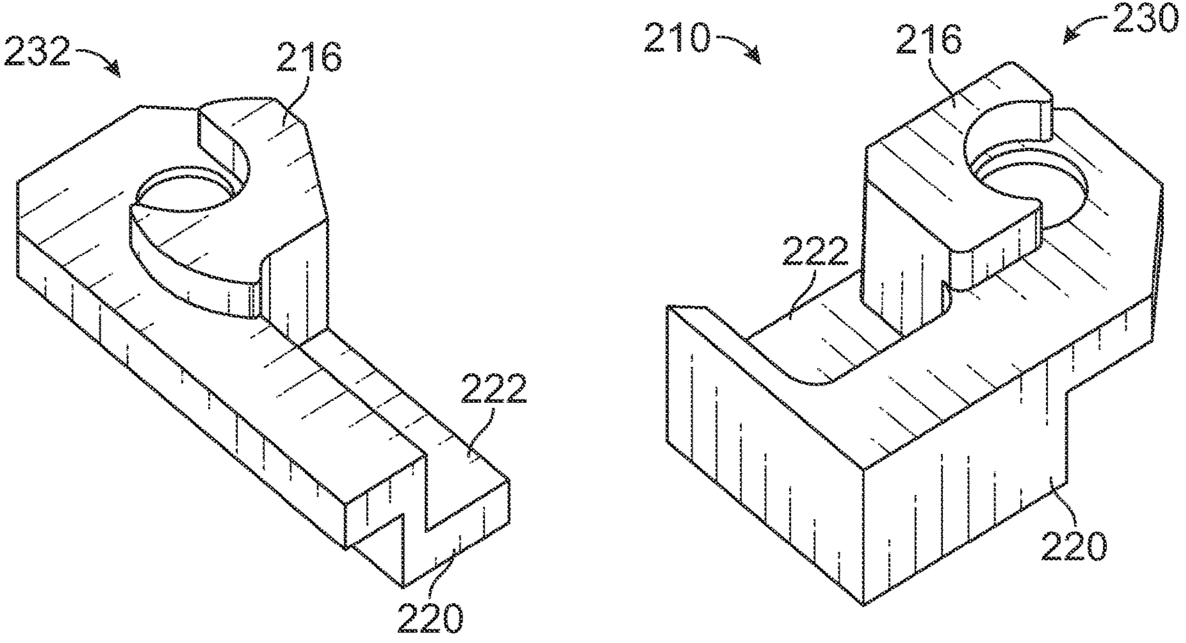
FIG. 7 is a rear perspective view of the front frame shown in FIG. 6 in accordance with an exemplary embodiment.

FIG. 7 is a rear perspective view of the front frame 210 shown in FIG. 6 in accordance with an exemplary embodiment. FIG. 7 shows the first and second front frame elements 230, 232. The front frame elements 230, 232 include corresponding locating elements 220 and float pockets 222. The front frame elements 230, 232 include the positioning tabs 216, which are configured to be received in the cutouts 60 of the substrate 50 (both shown in FIG. 3).

Figure 8:
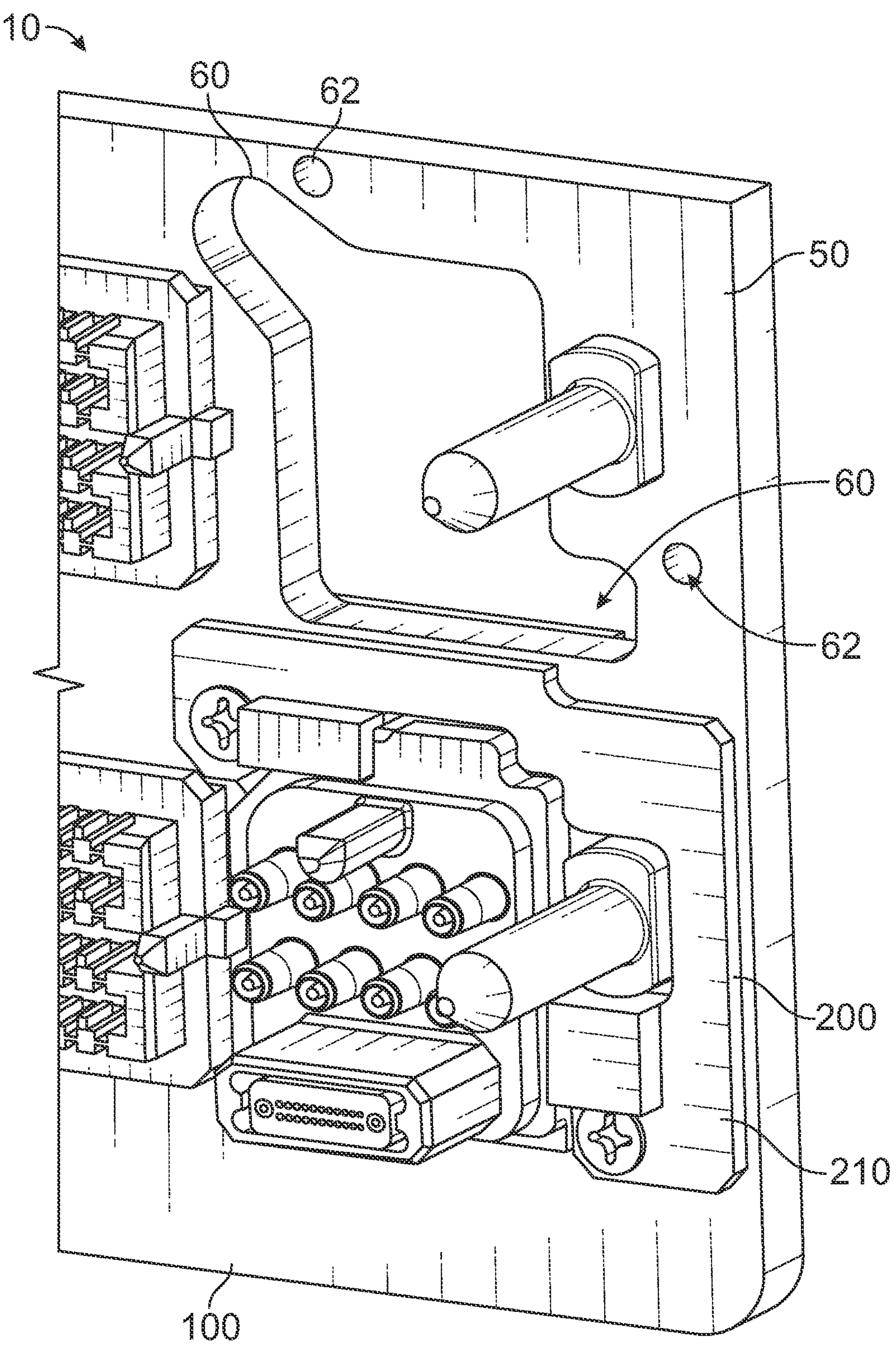
FIG. 8 is a front perspective view of a portion of the communication system showing the connector assembly in accordance with an exemplary embodiment.
Figure 9:
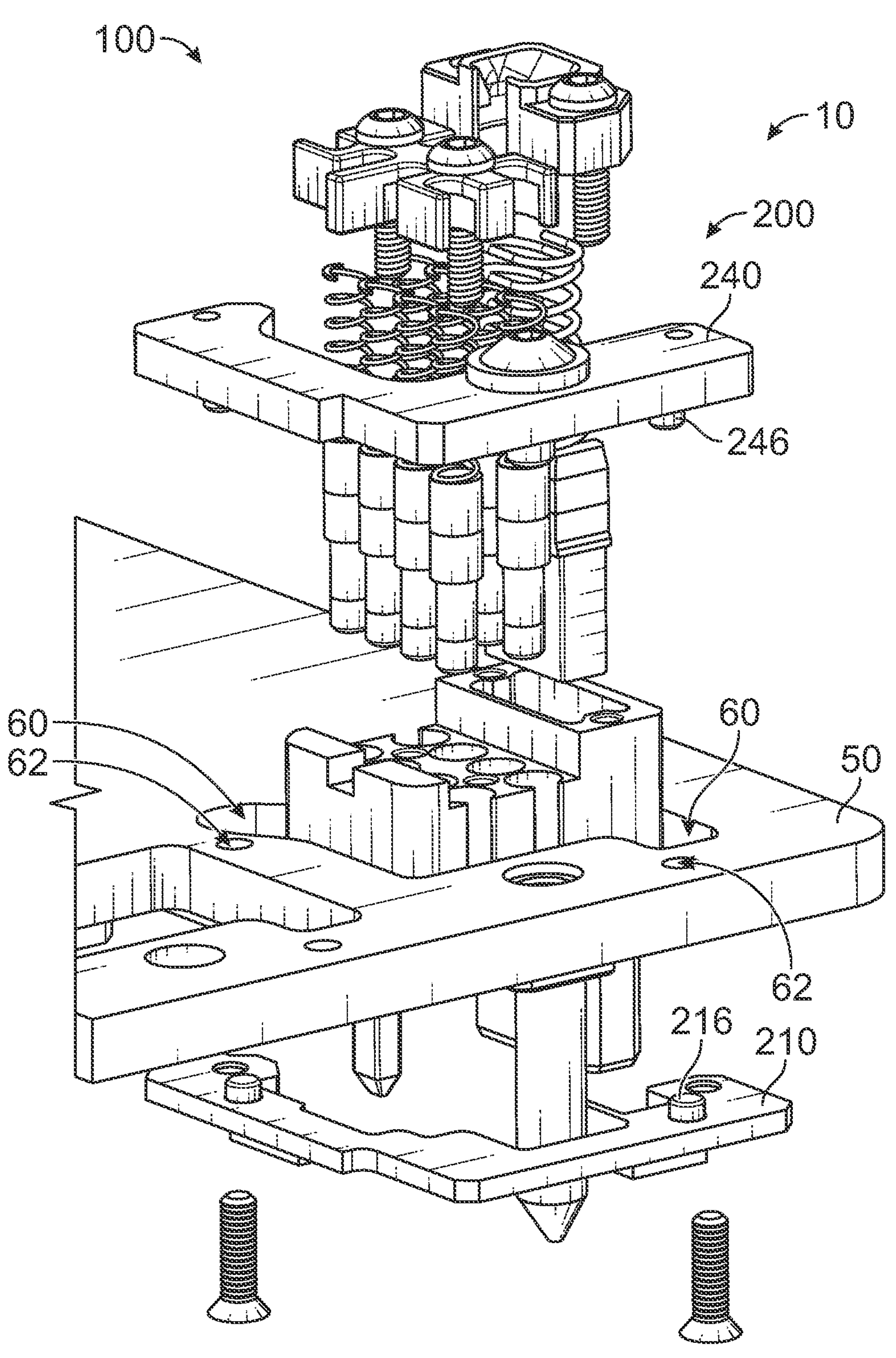
FIG. 9 is an exploded view of the connector assembly in accordance with an exemplary embodiment.

FIG. 8 is a front perspective view of a portion of the communication system 10 showing the connector assembly 100 in accordance with an exemplary embodiment. FIG. 9 is an exploded view of the connector assembly 100 in accordance with an exemplary embodiment. FIGS. 8 and 9 show the front and rear frames 210, 240 of the mounting frame 200 having a different shape. For example, the positioning tabs 216, 246 have different shapes and are at different locations. In the illustrated embodiment, the positioning tabs 216, 246 are posts configured to be received in openings 62 in the substrate 50 rather than in the cutouts 60. The positioning tabs 216, 246 may be cylindrical posts in various embodiments. In the illustrated embodiment, the front and rear frames 210, 240 each have a pair of the corresponding positioning tab 216, 246 used to control positions of the front and rear frames 210, 240 relative to the substrate 50.

Figure 10:
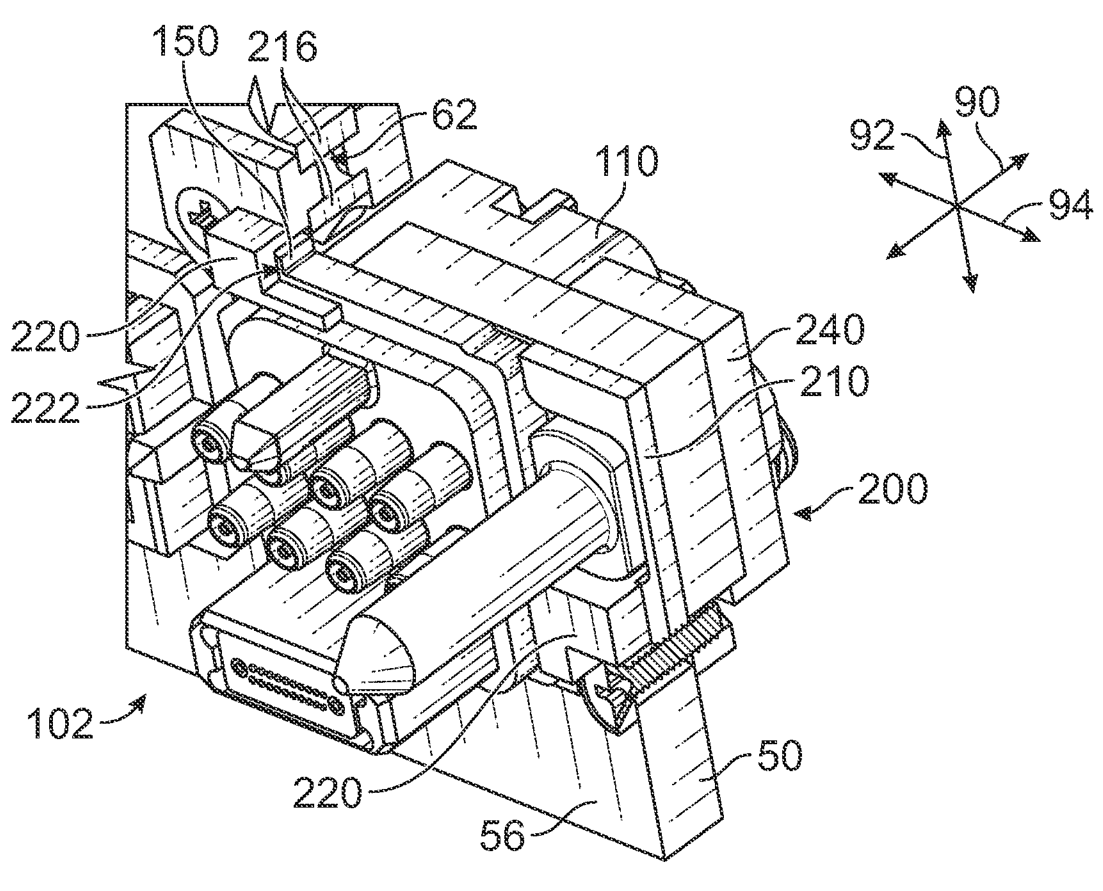
FIG. 10 is a sectional view of the connector module in accordance with an exemplary embodiment.
Figure 11:
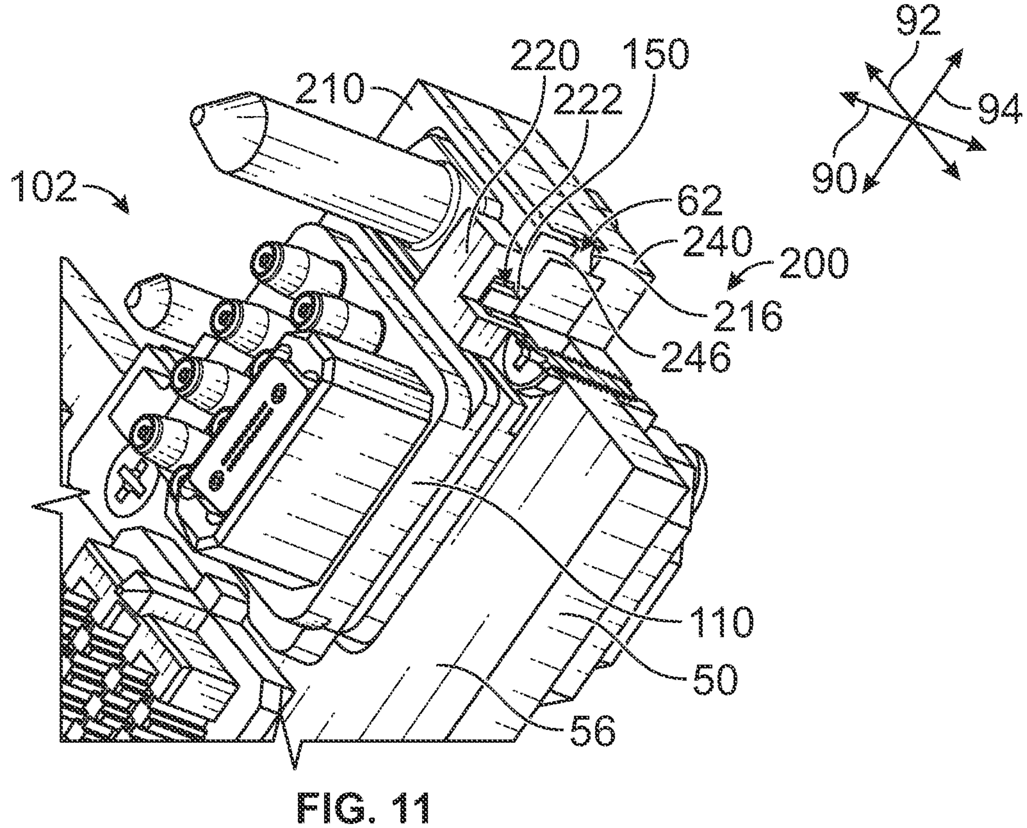
FIG. 11 is a sectional view of the connector module in accordance with an exemplary embodiment.

FIG. 10 is a sectional view of the connector module 102 in accordance with an exemplary embodiment. FIG. 11 is a sectional view of the connector module 102 in accordance with an exemplary embodiment. FIGS. 10 and 11 show the connector body 110 and the mounting frame 200 coupled to the substrate 50. The mounting frame 200 is used to secure the connector body 110 to the substrate 50. The positioning tabs 216, 246 are shown in the openings 62 in the substrate 50 to position the front and rear frames 210, 240 relative to the substrate 50.

When assembled, the floating elements 150 are received in the float pockets 222 of the locating elements 220. The locating elements 220 are oversized relative to the floating elements 150 to allow the floating elements 150 to move or float within the float pockets 222. The floating elements 150 are captured in the float pockets 222, such as being sandwiched between the locating element 220 and the front surface 56. The locating element 220 is located forward of the floating element 150 to prevent forward movement of the connector body 110 along the mating axis 90. The locating element 220 confines movement of the floating elements 150 in the lateral directions, such as along the first lateral axis 92 and/or the second lateral axis 94.

Figure 12:
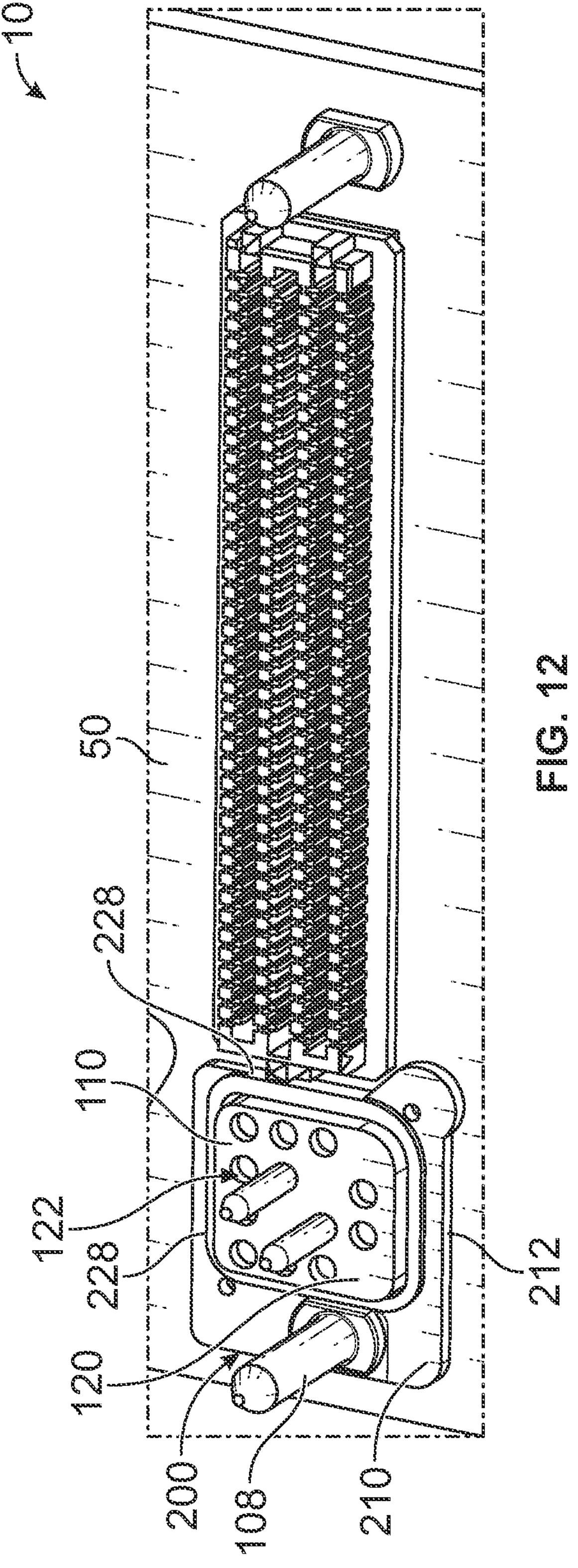
FIG. 12 is a front perspective view of a portion of the communication system showing the connector assembly in accordance with an exemplary embodiment.
Figure 13:
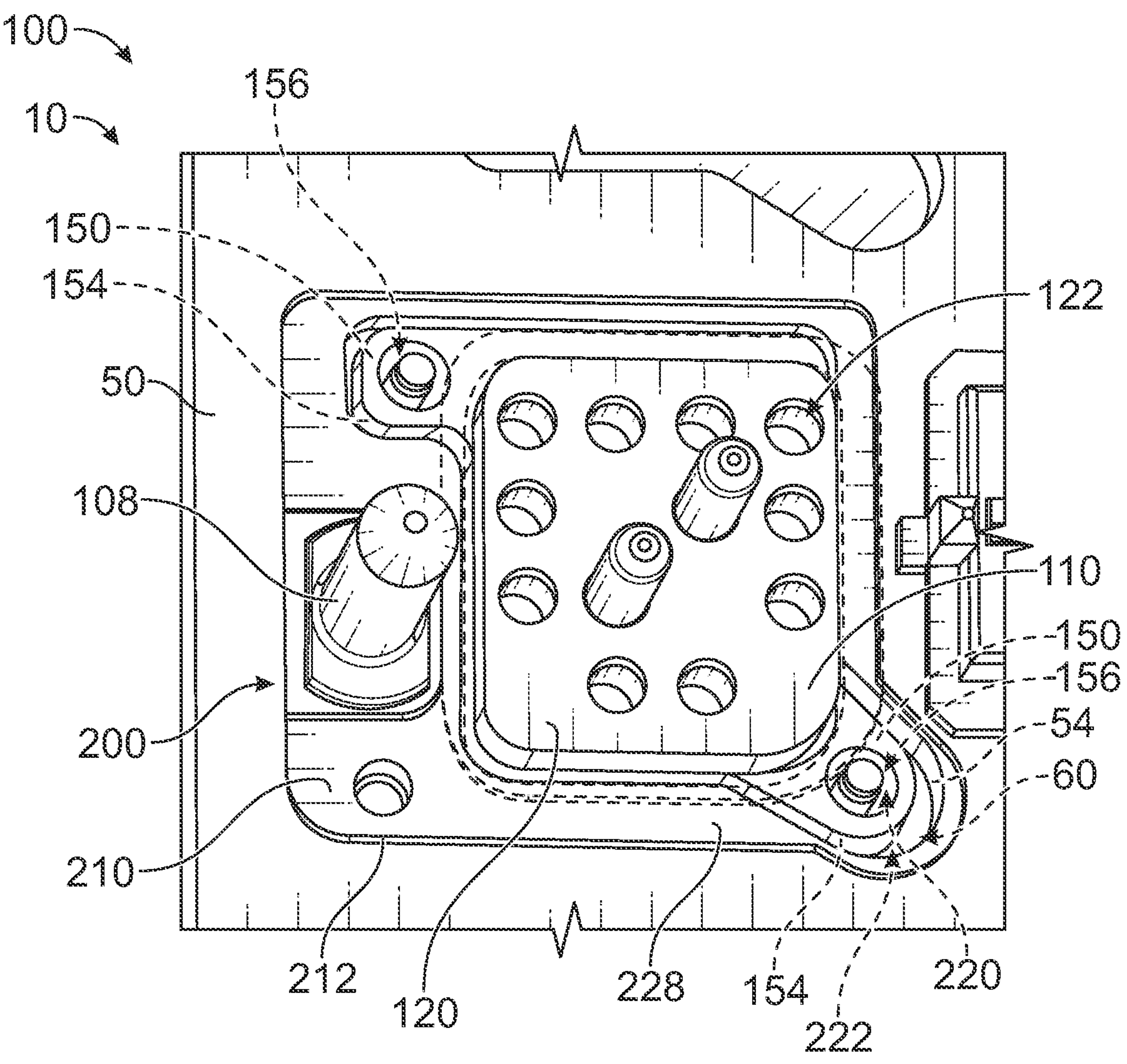
FIG. 13 is a front perspective view of the connector assembly showing portions of the connector body in phantom behind the mounting frame in accordance with an exemplary embodiment.
Figure 14:
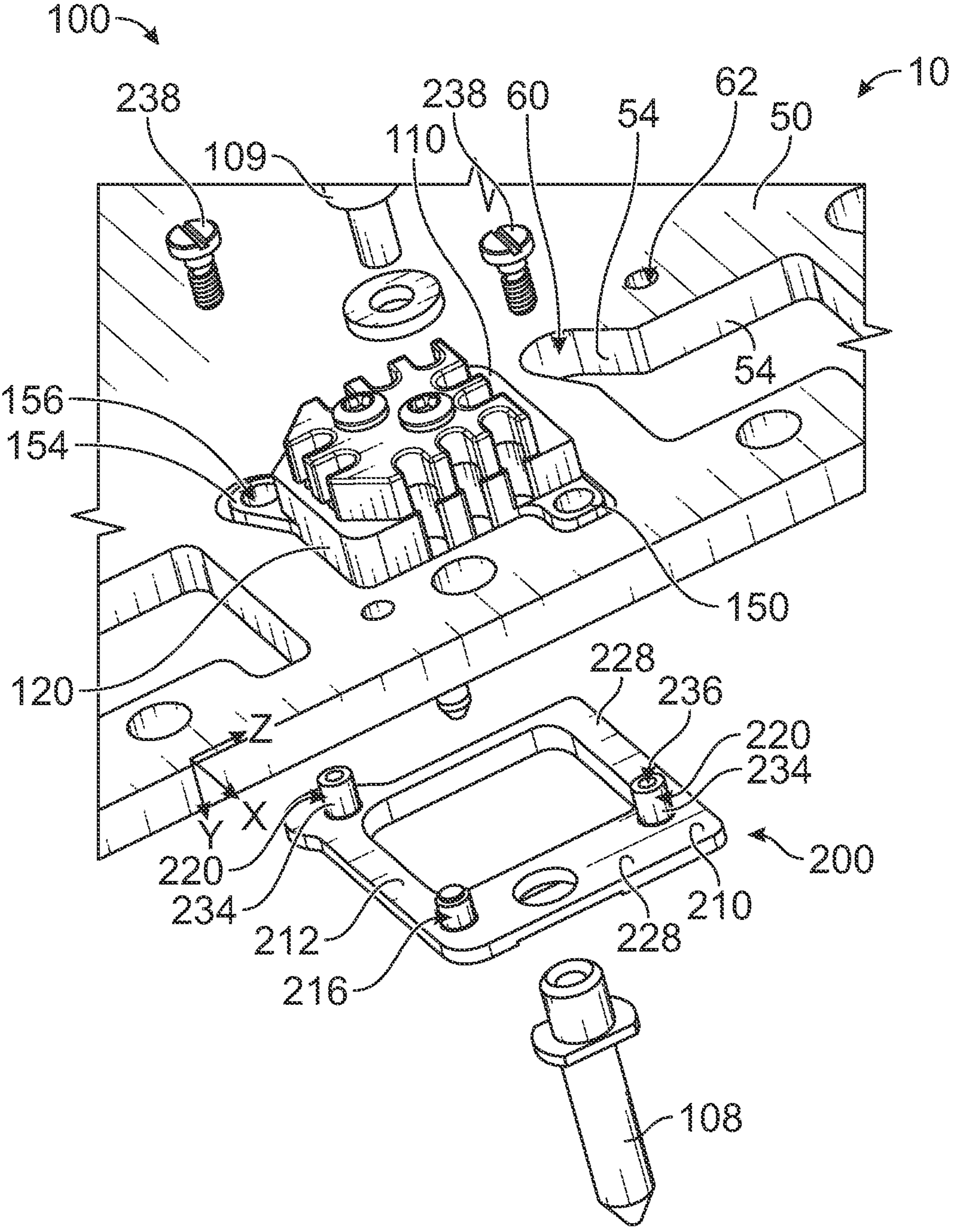
FIG. 14 is an exploded view of the connector assembly in accordance with an exemplary embodiment.

FIG. 12 is a front perspective view of a portion of the communication system 10 showing the connector assembly 100 in accordance with an exemplary embodiment. FIG. 13 is a front perspective view of the connector assembly 100 showing portions of the connector body 110 in phantom behind the mounting frame 200. FIG. 14 is an exploded view of the connector assembly 100 in accordance with an exemplary embodiment. FIGS. 12-14 show the connector body 110 and the mounting frame 200 having a different shape than the embodiment shown in FIGS. 1-3. For example, the mounting frame 200 includes a single frame element (for example, the front frame 210) rather than front and rear frame elements. The front frame 210 includes different positioning elements and securing elements to secure the front frame 210 to the substrate 50. The front frame 210 completely surrounds the connector body 110 rather than extending along only two sides of the connector body 110. The front frame 210 is configured to be secured to the substrate 50, such as using the fastener 109 and the guide module 108.

The front frame 210 includes frame members 228 forming an opening that receives and surrounds the connector body 110. The front frame 210 includes at least one positioning tab 216 extending from the inner surface 212. In the illustrated embodiment, the positioning tab 216 is a post, such as a cylindrical post. The positioning tab 216 is configured to be received in the opening 62 in the substrate 50.

The front frame 210 includes one or more locating elements 220. In the illustrated embodiment, the locating elements 220 extend from the inner surface 212. The locating elements 220 are configured to be received in the cutouts 60. In an exemplary embodiment, the locating elements 220 include tubes 234 having threaded bores 236. The threaded bores 236 are configured to receive fasteners 238, such as shoulder screws, which are used to secure the connector body 110 to the front frame 210. The tubes 234 may be cylindrical. The tubes 234 are configured to be spaced apart from the edges 54 defining the cutouts 60 to form the float pockets 222 between the tubes 234 and the edges 54 of the cutouts 60.

The connector body 110 includes the floating elements 150 extending from the housing 120 of the connector body 110. The housing 120 includes the contact channels 122. In the illustrated embodiment, the floating elements 150 include ears 154 extending from the sides of the housing 120. The ears 154 are configured to be received in the cutouts 60. The ears 154 include openings 156. The openings 156 are configured to receive the tubes 234. For example, the ears 154 are configured to be received in the float pockets 222 between the tubes 234 and the edges 54 of the cutouts 60.

Figure 15:
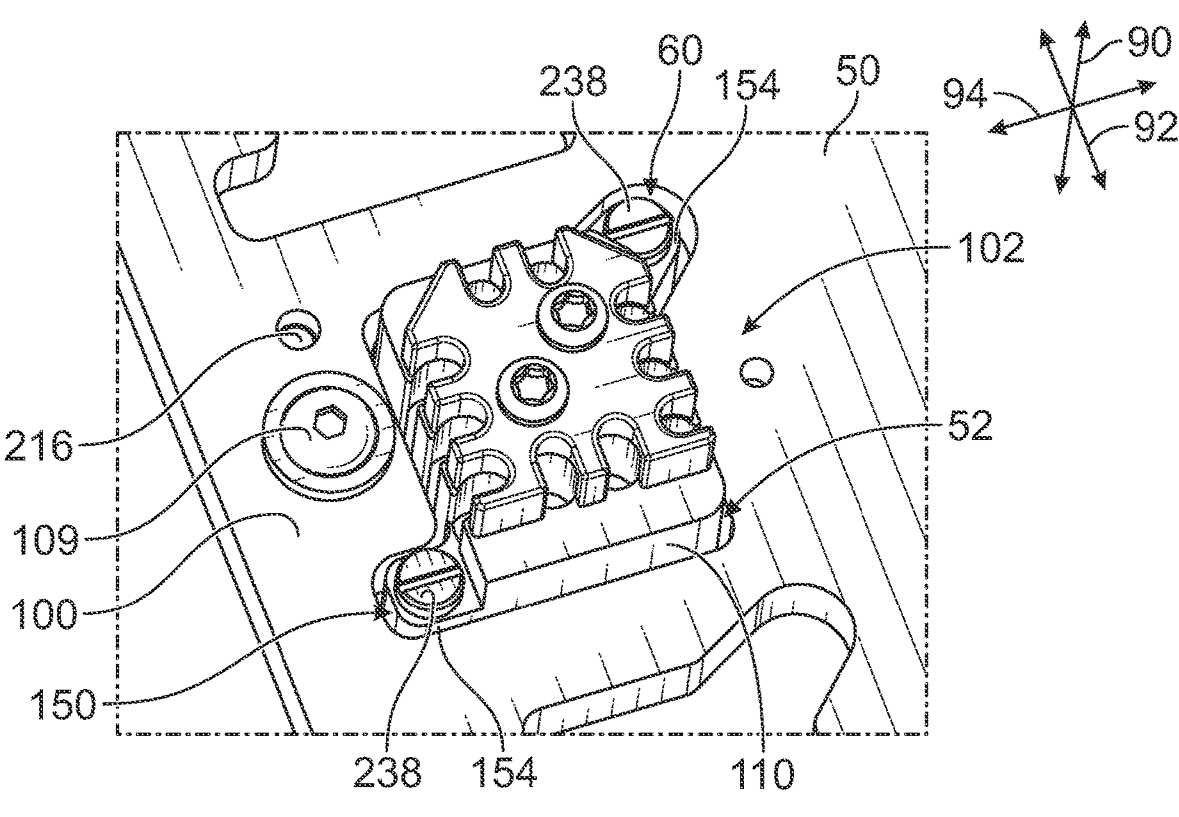
FIG. 15 is a rear perspective view of the connector assembly showing the connector body and the mounting frame coupled to the substrate in accordance with an exemplary embodiment.
Figure 16:
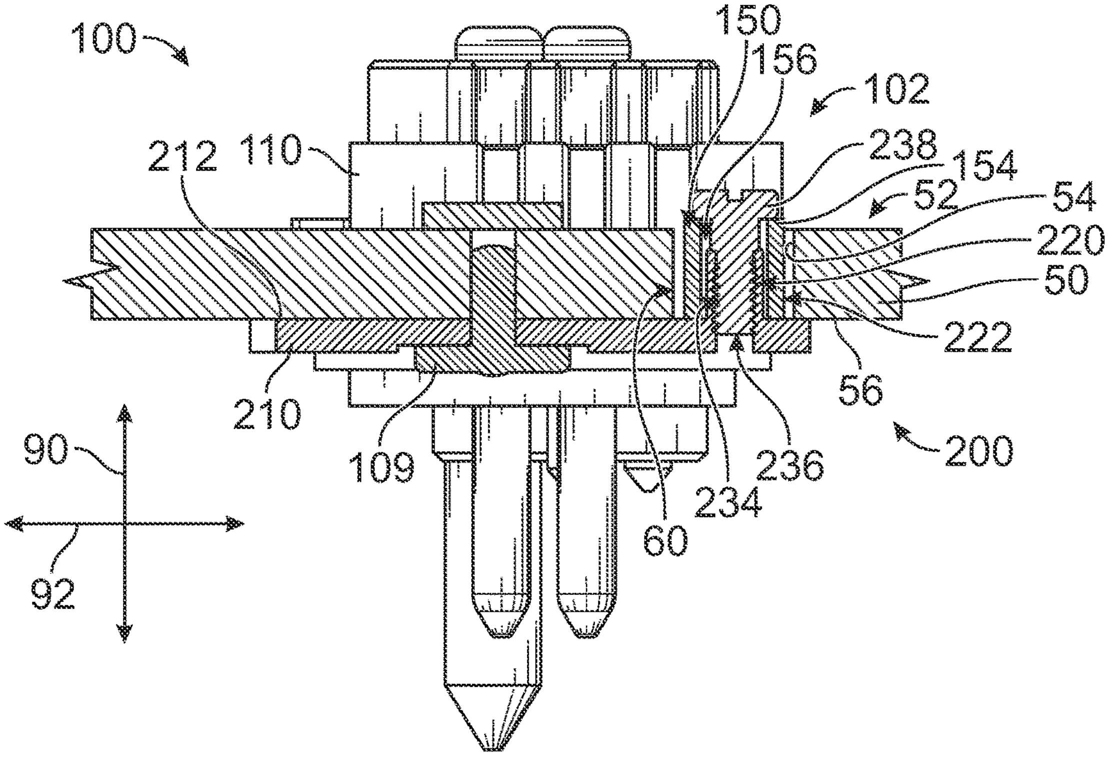
FIG. 16 is a sectional view of the connector module in accordance with an exemplary embodiment showing the connector body and the mounting frame coupled to the substrate in accordance with an exemplary embodiment.

FIG. 15 is a rear perspective view of the connector assembly 100 showing the connector body 110 and the mounting frame 200 coupled to the substrate 50 in accordance with an exemplary embodiment. FIG. 16 is a sectional view of the connector module 102 in accordance with an exemplary embodiment showing the connector body 110 and the mounting frame 200 coupled to the substrate 50.

During assembly, the connector body 110 is front loaded into the passage 52. For example, the connector body 110 is loaded into the passage 52 through the front surface 56 until the mounting flange 116 is seated at the front surface 56. The ears 154 are received in the cutouts 60. The ears 154 may have complementary shapes to the cutouts 60. In an exemplary embodiment, the cutouts 60 are oversized relative to the floating elements 150 (for example, ears 154) to allow floating movement of the floating elements 150 in the float pockets 222 (for example, in the gaps between the tubes 234 and the edges 54 of the cutouts 60).

During assembly, the front frame 210 is coupled to the substrate 50. For example, the inner surface 212 is seated against the front surface 56 of the substrate 50. The positioning tabs 216 are received in the openings 156 in the ears 154. The positioning tabs 216 are located in the cutouts 60 to locate the front frame 210 relative to the substrate 50. The front frame 210 is secured to the substrate 50 using the fastener 109. For example, the fastener 109 may be threadably coupled to the guide module 108 to secure the front frame 210 to the substrate 50. The front frame 210 is coupled to the substrate 50 to cover the connector body 110 and secure the connector body 110 to the substrate 50. During assembly, the fasteners 238 are threadably coupled to the threaded bores 236 of the positioning tabs 216 to secure the connector body 110 to the front frame 210. The fasteners 238 are shoulder screws. The openings 156 are oversized relative to the diameters of the fasteners 238 to allow lateral movement of the connector body 110 relative to the front frame 210. For example, the floating elements 150 (ears 154) are able to move laterally in the float pockets 222 between the tubes 234 and the edges 54 of the cutouts 60. The locating element 220 and the edges 54 of the cutouts 60 confine movement of the floating elements 150 in the lateral directions, such as along the first lateral axis 92 and/or the second lateral axis 94.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 39 U.S.C. § 112(f), unless and until such claim limitations expressly use the phrase "means for" followed by a statement of function void of further structure.

What is claimed is:

1. A connector assembly comprising:

a connector module having a connector body received in a passage through a substrate, the connector body extending between a front side forward of the substrate and a rear side rearward of the substrate, the connector body including a floating element extending from the connector body, the connector body having contact channels therethrough between the front side and the rear side, the contact channels holding RF contacts in corresponding contact channels, the RF contacts being presented along the front side for engaging corresponding mating contacts of a mating connector in a mating direction along a mating axis, the connector module including coaxial cables coupled to the RF contacts; and a mounting frame coupled to the substrate, the mounting frame having a locating element extending from the mounting frame, the locating element being spaced apart from the substrate to form a float pocket between the locating element and the substrate, the float pocket receiving the floating element of the connector body, the float pocket being oversized relative to the floating element and defining a confined space to allow floating movement of the floating element in the float pocket relative to the mounting frame and the substrate to allow a limited amount of floating movement of the connector module relative to the substrate in a lateral direction that is perpendicular to the mating direction.

2. The connector assembly of claim 1, wherein the float pocket is located forward of a front surface of the substrate.

3. The connector assembly of claim 1, wherein the connector body includes a flange seated on a front surface of the substrate, the flange forming the floating element received in the float pocket, the flange movable along the front surface of the substrate in the float pocket.

4. The connector assembly of claim 3, wherein the flange is captured in the confined space of the float pocket between the locating element and the front surface of the substrate.

5. The connector assembly of claim 1, wherein the mounting frame includes a front plate forward of the substrate and a rear plate rearward of the substrate, the rear plate being secured to a rear surface of the substrate, the front plate being secured to a front surface of the substrate, the front plate including the locating element spaced apart from the front surface of the substrate.

6. The connector assembly of claim 5, further comprising a guide pin extending from the front surface of the substrate to guide mating with the mating connector, the rear plate being coupled to the guide pin by a fastener passing through the substrate.

7. The connector assembly of claim 5, wherein the front plate includes a first plate member at a first side of the connector module and a second plate member at a second side of the connector module, the second plate member being separate and discrete from the first plate member.

8. The connector assembly of claim 5, wherein the locating element is a first locating element and the float pocket is a first float pocket, the front plate including a second locating element extending from the front plate, the second locating element being spaced apart from the front surface of the substrate to form a second float pocket between the second locating element and the front surface of the substrate, the second float pocket receiving a second floating element of the connector module and allowing a limited amount of floating movement of the connector module relative to the substrate in a second lateral direction that is perpendicular to the mating direction.

9. The connector assembly of claim 1, wherein the mounting frame includes a positioning tab received in an opening of the substrate to position the mounting frame relative to the substrate.

10. The connector assembly of claim 1, wherein the locating element is a first locating element and the float pocket is a first float pocket, the mounting frame including a second locating element extending from the mounting frame, the second locating element being spaced apart from the substrate to form a second float pocket between the second locating element and the substrate, the second float pocket receiving a second floating element of the connector module and allowing a limited amount of floating movement of the connector module relative to the substrate in a second lateral direction that is perpendicular to the mating direction.

11. The connector assembly of claim 1, wherein the locating element extends into the passage of the substrate, the confined space being defined between the locating element and an edge of the substrate defining the passage, the floating element of the connector module located in the passage and movable within the confined space between the locating element and the edge of the substrate defining the passage.

12. The connector assembly of claim 1, wherein the connector module includes a fiber optic connector, the fiber optic connector being presented along the front side for mating with a mating fiber optic connector in the mating direction, the connector module including a fiber optic cable coupled to the fiber optic connector.

13. A connector assembly comprising:

a connector module having a connector body received in a passage through a substrate, the connector body extending between a front side forward of the substrate and a rear side rearward of the substrate, the connector body including a floating element extending from the connector body, the connector body having contact channels therethrough between the front side and the rear side, the contact channels holding RF contacts in corresponding contact channels, the RF contacts being presented along the front side for engaging corresponding mating contacts of a mating connector in a mating direction along a mating axis, the connector module including coaxial cables coupled to the RF contacts; and a mounting frame coupled to the substrate, the mounting frame including a front plate forward of the substrate and a rear plate rearward of the substrate, the rear plate being secured to a rear surface of the substrate, the front plate being secured to a front surface of the substrate, the front plate having a locating element extending from the front plate, the locating element being spaced apart from the front surface of the substrate to form a float pocket forward of the front surface of the substrate between the locating element and the substrate, the float pocket receiving the floating element of the connector body, the float pocket being oversized relative to the floating element and defining a confined space to allow floating movement of the floating element in the float pocket relative to the mounting frame and the substrate to allow a limited amount of floating movement of the connector module relative to the substrate in a lateral direction that is perpendicular to the mating direction.

14. The connector assembly of claim 13, further comprising a guide pin extending from the front surface of the substrate to guide mating with the mating connector, the rear plate being coupled to the guide pin by a fastener passing through the substrate.

15. The connector assembly of claim 13, wherein the front plate includes a first plate member at a first side of the connector module and a second plate member at a second side of the connector module, the second plate member being separate and discrete from the first plate member.

16. The connector assembly of claim 13, wherein the locating element is a first locating element and the float pocket is a first float pocket, the front plate including a second locating element extending from the front plate, the second locating element being spaced apart from the front surface of the substrate to form a second float pocket between the second locating element and the front surface of the substrate, the second float pocket receiving a second floating element of the connector module and allowing a limited amount of floating movement of the connector module relative to the substrate in a second lateral direction that is perpendicular to the mating direction.

17. The connector assembly of claim 13, wherein the connector body includes a flange seated on a front surface of the substrate, the flange forming the floating element received in the float pocket, the flange movable along the front surface of the substrate in the float pocket.

18. A connector assembly comprising:

a connector module having a connector body received in a passage through a substrate, the connector body extending between a front side forward of the substrate and a rear side rearward of the substrate, the connector body including a floating element extending from the connector body, the connector body having a first contact channel therethrough between the front side and the rear side and a second contact channel therethrough between the front side and the rear side, the first contact channels holding an RF contact, the RF contact being presented along the front side for engaging a corresponding mating contact of a mating connector in a mating direction along a mating axis, the second contact channel holding a fiber optic connector, the fiber optic connector being presented along the front side for mating with a mating fiber optic connector in the mating direction, the connector module including a fiber optic cable coupled to the fiber optic connector, the connector module including a coaxial cable coupled to the RF contact; and a mounting frame coupled to the substrate, the mounting frame having a locating element extending from the mounting frame, the locating element being spaced apart from the substrate to form a float pocket between the locating element and the substrate, the float pocket receiving the floating element of the connector body, the float pocket being oversized relative to the floating element and defining a confined space to allow floating movement of the floating element in the float pocket relative to the mounting frame and the substrate to allow a limited amount of floating movement of the connector module relative to the substrate in a lateral direction that is perpendicular to the mating direction.

19. The connector assembly of claim 18, wherein the connector body includes a flange seated on a front surface of the substrate, the flange forming the floating element received in the float pocket, the flange movable along the front surface of the substrate in the float pocket, the flange being captured in the confined space of the float pocket between the locating element and the front surface of the substrate.

20. The connector assembly of claim 18, wherein the mounting frame includes a front plate forward of the substrate and a rear plate rearward of the substrate, the rear plate being secured to a rear surface of the substrate, the front plate being secured to a front surface of the substrate, the front plate including the locating element spaced apart from the front surface of the substrate.

* * * * *